Feb. 16, 1965    R. GAYLOR ETAL    3,169,730
FLIGHT CONTROL SYSTEM
Filed Nov. 1, 1962    8 Sheets-Sheet 1

INVENTORS
RANDALL GAYLOR
ROBERT L. SCHAEPERKOETTER
EVERETT R. TRIBKEN
BY
ATTORNEY

INVENTORS
RANDALL GAYLOR
ROBERT L. SCHAEPERKOETTER
EVERETT R. TRIBKEN
BY
ATTORNEY

United States Patent Office 3,169,730
Patented Feb. 16, 1965

3,169,730
FLIGHT CONTROL SYSTEM
Randall Gaylor and Robert L. Schaeperkoetter, Phoenix, and Everett R. Tribken, Scottsdale, Ariz., assignors to Sperry Rand Corporation, Great Neck, N.Y., a corporation of Delaware
Filed Nov. 1, 1962, Ser. No. 234,621
25 Claims. (Cl. 244—77)

This invention relates in general to aircraft control apparatus and more particularly to apparatus for controlling the flight of an aircraft during landing maneuvers.

The principal aspects of the invention are:

(a) Providing craft control first to a defined glide path that makes a preselected angle with respect to the ground and then to a defined less steep preselected terminal path, both of which intersect the ground at points different from a point the elevation angle from which and the distance to which are known.

(b) Stabilizing the angle that the defined glide path makes with the earth but varying its intersection point with the earth directly as a function of the head wind speed and inversely as a function of the selected glide path angle, while stabilizing the angle that the terminal path makes with respect to the air mass but varying the angle that the terminal path makes with the earth directly as a function of the head wind speed, thereby assuring minimal dispersion (due to winds) of the craft touchdown point while placing emphasis on aerodynamic control during the final seconds of the landing maneuver.

(c) Varying the altitude at which the flare maneuver is executed directly as a function of the head wind speed and the craft approach rate to the terminal path.

(d) Bracketing the defined glide path by comparing signals representing the rate of approach to and the displacement from the path, but varying the ratio of the gain of the rate signal to the gain of the displacement signal directly as a function of the displacement from the glide path, thereby changing the sharpness of the ordered approach path in inverse relationship to the craft displacement from the glide path.

(e) During the bracketing maneuver, combining the autopilot control signal with a pitch bias signal that varies in proportion to the closure rate to the defined glide path, whereby craft coupling to the glide path is made easier.

(f) Algebraically adding a two-part pitch bias signal to the autopilot control signal during the flare maneuver, the first part of which is short term and variable directly as a function of the selected glide path angle and inversely as a function of the head wind speed, and the second part of which is long term.

(g) Retarding the craft throttles during the landing maneuver in proportion to an increasing commanded angle of attack and then at the flare point automatically retarding them to their idle positions, the angle of attack at the flare point being such that the craft though it gradually pitches up (increasing angle of attack) to hold the defined terminal path, it nevertheless has at touchdown an angle of attack which is less than the stall angle of attack.

(h) Varying the commanded angle of attack directly as a function of the selected glide path angle, and inversely as a function of the range of the craft to the touchdown point.

In illustrating how the above aspects are provided by the instant invention, a basic form of apparatus is described; then successive modifications to the basic form are described, the result being that the somewhat comprehensive complete apparatus is easier to understand and appreciate.

Throughout the specification, devices for performing mathematical operations are called for; these devices may take various forms and, for typical (electrical) devices useful with the invention, reference should be had to Massachusetts Institute of Technology, Radiation Laboratory Series, volume 19, McGraw-Hill Book Company, Inc., New York, chapters 18 and 19.

A principal object of the invention is to provide apparatus for controlling the flight of an aircraft during a landing maneuver.

Another object of the invention is to provide apparatus that provides radio control of an aircraft throughout a landing maneuver.

Another object of the invention is to provide apparatus that incorporates the aforedescribed novel aspects.

The invention will be described with reference to the figures wherein.

Figure 1:
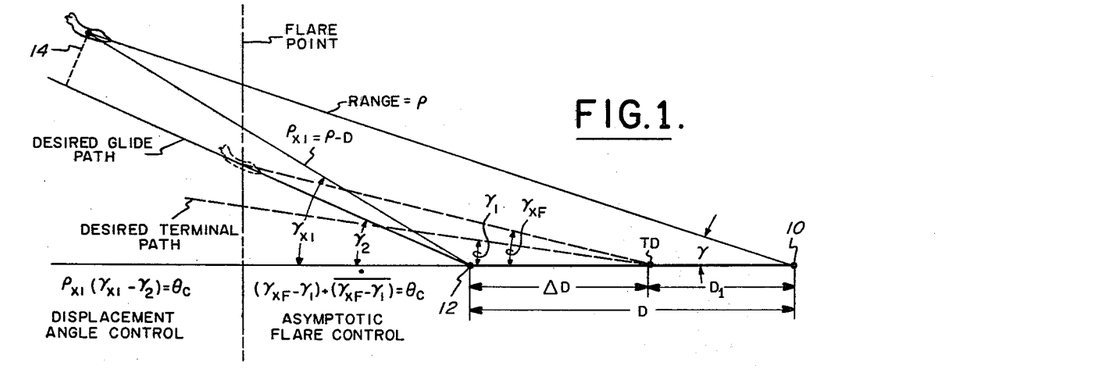
FIG. 1 is a diagram depicting geometry that serves as a basis for computations performed by apparatus embodying the invention.

Referring to FIG. 1, an aircraft is shown at a range $\rho$ from a site 10 on the ground, the craft being at an elevation angle $\gamma$ from the site 10. A distance D separates the site 10 from a point on the ground 12 from which a desired glide path emanates. The desired glide path makes the angle $\gamma_2$ with respect to the ground. Between the ground points 10 and 12 is a desired touchdown point TD from which a desired terminal path (less steep than the desired glide path) emanates. The desired terminal path makes the angle $\gamma_1$ with respect to the ground and has its ground emanating point separated from the point 12 by the distance $\Delta D$ and from the point 10 by the distance $D_1$. As shown, the craft is at a range $\rho_{XI}$ from the ground point 12 during the initial or glide path phase of the landing maneuver and, because the angles concerned are small, $\rho_{XI}$ may be considered equal to the distance $\rho - D$. The craft flight path angle to the ground point 12 during the glide path phase is $\gamma_{XI}$. Throughout the following discussion (as above) subscripts XI and XF are used continually in place of the singular subscript X. This is done to indicate "initial" (glide path) and "final" (terminal path) phases of the landing maneuver. It should be realized here, however, that the apparatus provided by the invention, by switching aiming points 12 and TD (i.e. by computing first with $D_1+\Delta D$ and then finally with only $D_1$) obviates the need for distinguishing between initial and final $\gamma_X$ and $\rho_X$ terms.

As can be readily appreciated from FIG. 1, the angular displacement of the craft from the desired glide path is the angle $\gamma_{XI}-\gamma_2$. Therefore, the craft displacement 14 from the desired glide path approximately equals $$\rho_{XI}(\gamma_{XI}-\gamma_2)$$

With the craft on the desired glide path and at a point in space at which a flare maneuver is to be executed, i.e. the flare point, the craft range to the desired touchdown point TD is $\rho_{XF}$ and the elevation angle from the TD point is $\gamma_{XF}$. Under these conditions, the craft is angularly displaced from the desired terminal path by an angle $(\gamma_{XF}-\gamma_1)$.

Figure 2:
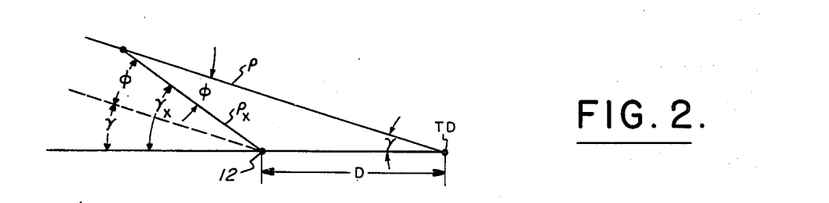
FIG. 2 is a diagram depicting a geometric scheme useful in computing the flight path angle of the craft to the point at which the defined glide path intersects the ground.

To appreciate how the angle $\gamma_X$ may be derived from the above mentioned terms, reference should be had to FIG. 2 which shows a dashed line drawn parallel to the range line $\rho$ and emanating from one of the aiming points, i.e. either the point 12 or the touchdown point TD depending on whether the craft is in the initial or final phase of the landing maneuver; therefore, the I and F subscripts are ignored. As can be readily seen the angle $\gamma_X$ equals the angle $\gamma$ plus an angle $\phi$ (which in turn equals its "alternate interior angle" $\phi$ within the triangle comprising sides $\rho_X$, $\rho$ and D). By the law of sines, the following expression can be set forth:

$$\frac{\phi}{D}=\frac{\gamma}{\rho_X}$$

from which $$\phi=\frac{D\gamma}{\rho_X}$$

Since $$\gamma_X=\gamma+\phi$$

$$\gamma_X=\gamma+\frac{D\gamma}{\rho_X}$$

Generally, apparatus embodying the invention receives from external sources only signals representing $\rho$ and $\gamma$, all other signal representative terms being preselected or derived by the apparatus. During the glide path phase of the landing maneuver a control signal $\theta_C$ is continually computed and applied to cause the craft glide path displacement $\rho_{XI}(\gamma_{XI}-\gamma_2)$ to be cancelled. With the craft on the desired glide path at the flare point, a maneuver is executed to cause the craft to approach asymptotically the desired terminal path, this being done by controlling the craft in accordance with a signal resulting from the algebraic addition of a signal representing the displacement of the craft from the desired terminal path and a signal representing the rate of change of the craft displacement from that path, i.e. the control signal $\theta_C$ to be cancelled during the terminal path phase is $$(\gamma_{XF}-\gamma_1)+\overline{(\gamma_{XF}-\gamma_1)}$$

In implementing the above-described geometric considerations (see FIG. 3), a range measuring device 16 is used to provide a signal representing the range $\rho$ to the site 10 and an elevation angle measuring device 18 is used to provide a signal representing the angle $\gamma$. The devices 16 and 18 may take sundry forms and may even be included in the same equipment as is shown and described in I.R.E. Transactions on Aeronautical and Navigational Electronics, volume ANE–6, No. 2, page 135, June 1959. A glide slope angle selector 20 provides a signal $\gamma_2$ and a terminal path angle selector 22 provides a signal representing a terminal path $\gamma_1$. A selector 24 applies its output signal $D_1$ to a summing device 26 which also receives the output signal $\Delta D$ from a selector 28 through a switch 30a which is maintained in the position shown during the initial or glide path phase of the landing maneuver. The output signal from the summing device 26 is applied to a divider 32 and to a subtraction device 34. The subtraction device 34 also receives the signal $\rho$ to produce the signal $\rho_X$. The subtraction device 34 output signal $\rho_X$ is applied then to the divider 32, the output signal of which is applied to a multiplying device 36. The divider 32 output signal is multiplied by the signal $\gamma$ provided by the elevation angle measuring device 18 and then the product of such multiplication is added to the signal $\gamma$ by a summing device 38 to produce the signal $\gamma_X$. The $\gamma_X$ signal and the $\gamma_2$ signal from the glide slope angle selector 20 are applied to a subtraction device 40, the output signal from which is applied to a multiplying device 42 to provide a product signal representing the craft linear displacement from the desired glide path, such signal being applied to a point 0 through a switch 30b and being useful during the initial phase of the landing maneuver to control the craft.

Figure 3:
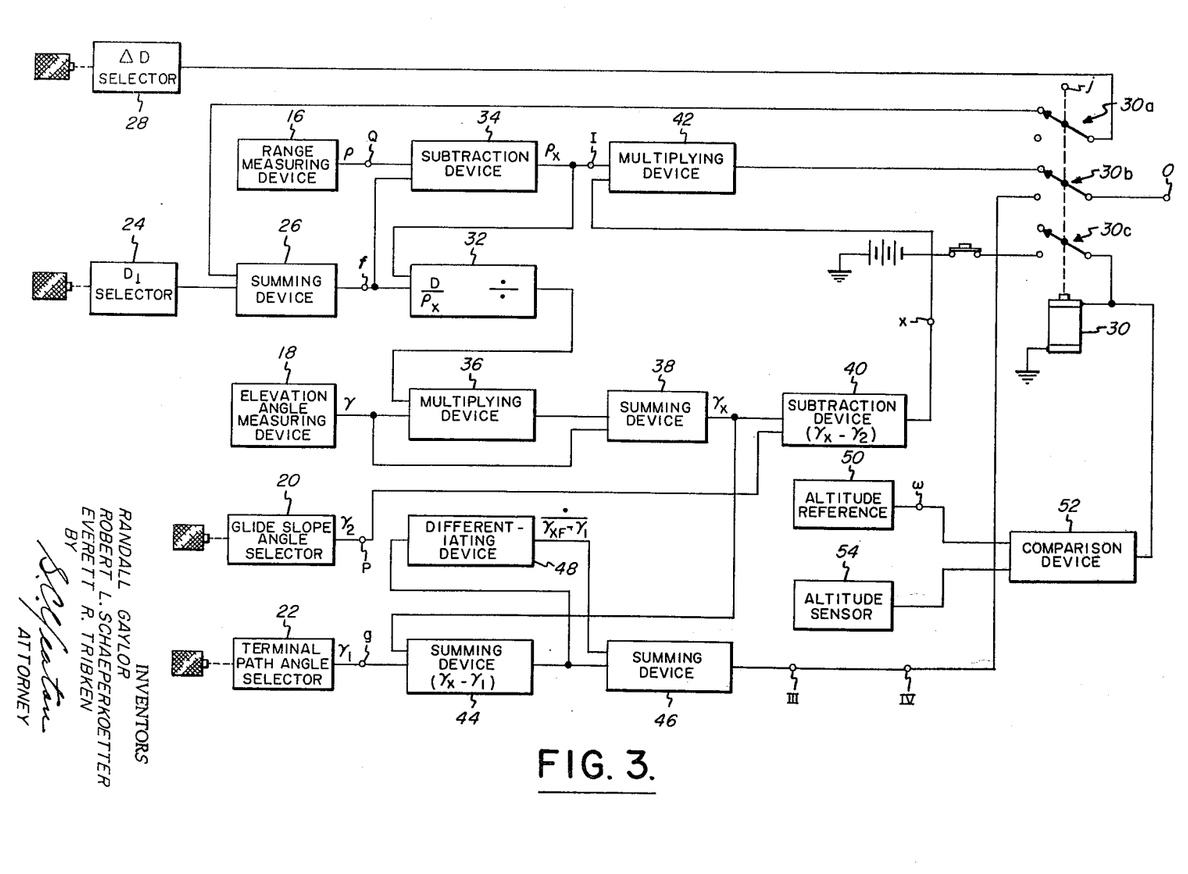
FIG. 3 is a block diagram of apparatus embodying a basic form of the invention.

The output signal $\gamma_X$ from the summing device 38 is applied to a subtraction device 44 together with the signal $\gamma_1$ from the terminal path angle selector 22 to provide at the output of the subtraction device 44 a signal representing the craft angular displacement from the desired terminal path. This signal is applied then to a summing device 46 and to a differentiating device 48, the output signal of which is also applied to the summing device 46. Therefore, the summing device 46 output signal represents the algebraic sum of displacement and rate signals, such sum signal being applied through the switch 30b to the point 0 when the switch 30b is in its lower position. When the switch 30b is in its lower position, the craft is in its final phase of the landing maneuver and control is to the desired terminal path.

An altitude reference device 50 provides a bias signal representing the altitude at which the flare maneuver is to be commenced and applies such signal to a comparison device 52, e.g. the device shown and described in M.I.T. Radiation Laboratories Series, volume 19, page 343, McGraw-Hill Book Company, New York. The comparison device 52 also receives the output signal from an altitude sensor 54 and provides an output pulse at the instant the altitude reference signal and the signal from the altitude sensor are the same, such signal being applied to actuate a self-holding relay 30 having self-holding contacts 30c.

During the glide path phase of the landing maneuver when the switches 30a, 30b and 30c are in their upper positions, the summing device 26 output signal is representative of the distance D, i.e. $\Delta D+D_1$. As a result the craft is directed to fly toward the aiming point 12 on the ground. At the instant the switches 30a, 30b and 30c move to their lower positions the $\Delta D$ signal is removed from the summing device 26 input and, as a result, the summing device 26 output signal becomes representative only of the distance $D_1$. Because of this, the aiming point to which the craft is ordered to fly shifts to the touchdown point TD. To cause the craft to approach asymptotically the desired terminal path, the differentiating circuit 48 provides a displacement rate signal $$\overline{(\gamma_{XF}-\gamma_1)}$$

which is algebraically added to the displacement signal to provide a composite control signal to be cancelled; at the instant the craft assumes the desired terminal path the displacement and displacement rate signals are zero.

Figure 4:
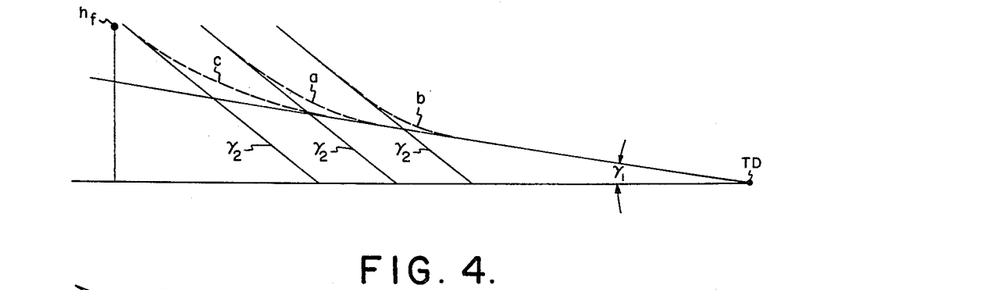
FIG. 4 is a diagram showing how winds affect the point of intersection of the selected glide path with the ground.

The above description has been set forth with no consideration being given to head wind speed and selected glide path angle. Should there be an appreciable head wind, the ordered asymptotic flare path will probably not be sharp enough to allow the craft to acquire the terminal glide path along a continuous smooth asymptotic course. For this reason the desired glide path aiming point 12 is moved closer to the touchdown point as a function of the head wind speed, i.e. the greater the head wind, the smaller the distance signal $\Delta D$. This has the effect of ordering a sharp flare maneuver because the displacement of the craft from the desired terminal path at the flare altitude $h_f$ will be greater when the desired glide path aiming point 12 intersects the ground in close than when it intersects the ground at a more distant point. To appreciate why this is so, reference should be had to FIG. 4 which shows ordered asymptotic flare paths (resulting from displacement and displacement rate comparisons) for no wind, head wind and tail wind conditions, respectively flare paths $a$, $b$ and $c$. For a given flare altitude $h_f$, the displacement signal for flare path $b$ is the greatest; hence, the rate-displacement comparison here will order a sharp flare path. Correspondingly, the tail wind flare path $c$ is not sharp.

Since, as mentioned above, no consideration was given in the description of the basic form of the invention to the selected glide path angle $\gamma_2$, an improved form of the invention moves the aiming point 12 of the desired glide path toward the touchdown point TD as an inverse function of the selected glide path angle $\gamma_2$. Therefore, for steep approaches to the terminal path (large $\gamma_2$) the aiming point 12 is moved farther from the touchdown point TD to assure eventual coupling to the terminal path. For shallow approaches to the terminal path (small $\gamma_2$) coupling presents no problem and therefore the aiming point 12 can move close to the touchdown point TD.

By changing the aiming point 12 as a function of the wind speed, the desired glide path is stabilized with respect to the earth (so long as the wind speed does not change), thereby placing emphasis during the glide path phase of the landing maneuver on earth coordinates and assuring "minimal" dispersion of the actual touchdown point of the aircraft. The reason for using the expression "minimal" above is that apparatus embodying the present improvement further places emphasis during the terminal phase of the landing maneuver on aerodynamic stability of the craft and, in so doing, causes the craft to fly a fixed path with respect to the air mass, such path however being to a fixed ground point.

In placing emphasis on earth coordinates during the glide path phase of the landing maneuver, the $\Delta D$ signal described with reference to FIG. 3 is varied as an inverse function of head wind speed and as a direct function of the selected glide path angle; in placing emphasis on air mass coordinates during the terminal path phase of the landing maneuver, a terminal path angle $\gamma_1'$ with respect to the air mass is selected and then a terminal path angle $\gamma_1$ is flown with respect to the earth so that the path angle with respect to the air mass is fixed.

Figure 5:
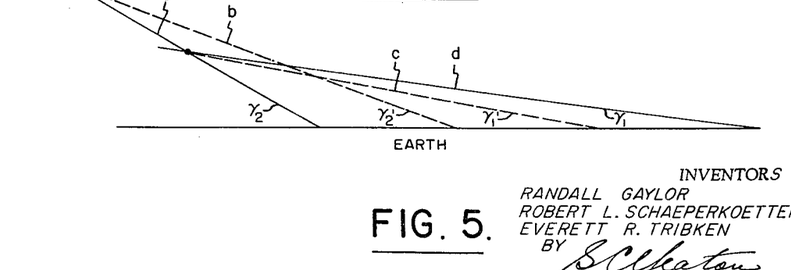
FIG. 5 is a geometric scheme useful in deriving wind corrections for the glide and terminal paths.

To provide the $\Delta D$ correction mentioned above, the glide path angle $\gamma_2'$ that the craft must fly with respect to the air mass in order to fly a glide path angle $\gamma_2$ with respect to the earth is computed. (Hereafter primed terms are used to indicate air mass relationships and unprimed terms to indicate earth coordinate relationships.) Then, the $\Delta D$ term is varied as a direct function of the $\gamma_2'$ term, the permissibility of which is discussed later. A convenient way of arriving at the angles $\gamma_2'$ and $\gamma_1$ that the craft must fly with respect respectively to the earth and air mass is shown in FIG. 5. To fly the course $a$ of FIG. 5 in the presence of a head wind requires that the course $b$ be flown with respect to the air mass, the course $b$ making the angle $\gamma_2'$ with respect to the earth; to fly the course $c$ in the presence of a head wind requires that the craft fly the course $d$.

Realizing that the rate of descent of the craft in terms of earth coordinates is $\rho\gamma_2$ and in terms of air mass coordinates is $v\gamma_2'$ (where $v$ equals air speed), the following expression can be set forth:

$$\gamma_2' = \frac{\dot{\rho}}{v}\gamma_2$$

Since $\Delta D$ is desired to be varied as an inverse function of the head wind speed and as a direct function of the selected glide path angle $\gamma_2$, $\Delta D$ may vary as a direct function of $\gamma_2'$, i.e. $\gamma_2'$ also varies as an inverse function of the head wind speed and as a direct function of the selected glide path angle $\gamma_2$ (the term $$\frac{\dot{\rho}}{v}$$

being variable inversely with head wind speed). Empirically then, the following expression can be set forth from FIG. 5 for the desired terminal path $\gamma_1$ that must be flown to fly a terminal path $\gamma_1'$ (aerodynamic emphasis):

$$\gamma_1 = \frac{v}{\dot{\rho}}\gamma_1'$$

Figure 6:
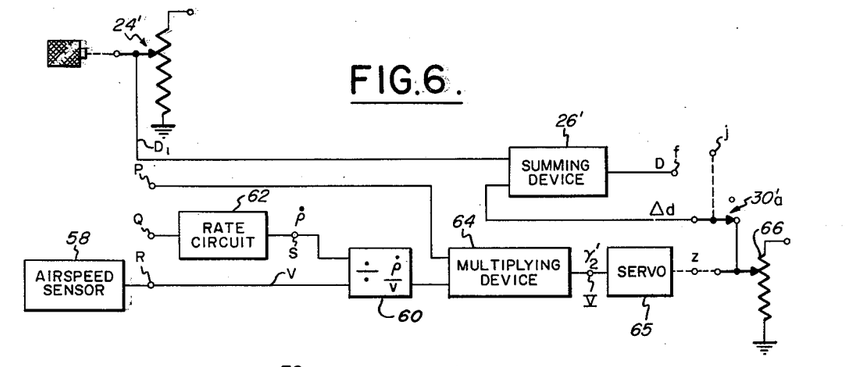
FIG. 6 is a block diagram of apparatus adapted to provide the glide path wind correction.

The implementation of the $\Delta D$ correction necessary during the glide path phase of a landing maneuver is shown in FIG. 6 as having a manually settable potentiometer 24' which is set to provide a signal proportional to the distance $D_1$. (It is to be here noted that the distance $D_1$ will vary from craft to craft and for different landing conditions.) An air speed sensor 58 adapted to provide an air speed signal $v$ applies its output signal to a divider 60. The divider 60 also receives a signal representing the craft rate of change of ground speed $\dot{\rho}$ from a rate circuit 62 adapted to be connected to receive the signal $\rho$ appearing at the point Q of FIG. 3. The divider output signal $$\frac{\dot{\rho}}{v}$$

is applied then to a multiplying device 64 adapted to receive also the signal $\gamma_2$ which appears at the point P of FIG. 3. Hence, the multiplying device 64 produces an output signal $\gamma_2'$, such signal being applied to a position servo 65 the output shaft of which drives the wiper of a potentiometer 66 wound to provide the function $\Delta D$. The $\Delta D$ signal at the potentiometer 66 wiper is applied through the switch 30a' to a summing device 26' (only during glide path phase) adapted to receive also the signal $D_1$ from the wiper of the potentiometer 24' to produce the output signal D. The entire circuit of FIG. 6 is then connected to point $f$ of FIG. 3 instead of the circuit consisting of elements 24, 26, 28 and 30a.

Figure 7:
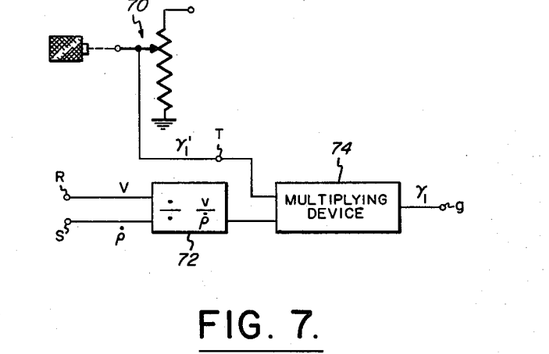
FIG. 7 is a block diagram of apparatus adapted to provide the terminal path wind correction.

For an implementation of the technique that provides emphasis on aerodynamic stability during the terminal path phase of the landing maneuver, reference should be had to the circuit of FIG. 7 which is adapted to replace the selector 22 of FIG. 3 (and be connected instead to the point $g$). A potentiometer 70, the wiper of which is adapted to be set in proportion to the selected terminal path angle $\gamma_1'$ (which is invariant with respect to the air mass), applies the $\gamma_1'$ signal to a multiplying device 74. A divider 72 adapted to receive air speed and ground speed signals from points S and R of FIG. 6 respectively provides the quotient signal $$\frac{v}{\dot{\rho}}$$

and applies such signal to the multiplying device 74, the multiplier 74 output signal then producing the product signal $\gamma_1$ which is applied to the point $g$ of FIG. 3.

Figure 8:
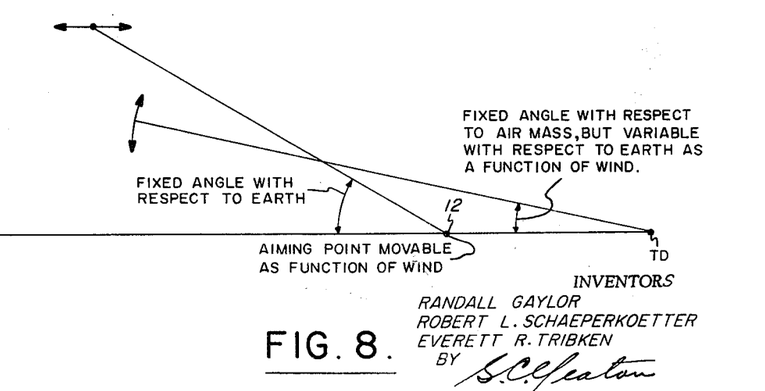
FIG. 8 is a diagram useful in teaching the control technique afforded by the wind correction apparatus of FIGS. 6 and 7.

To understand what the correction apparatus of FIGS. 6 and 7 combine to do when used to modify the apparatus of FIG. 3, reference should be had to FIG. 8. The apparatus of FIG. 6 causes the desired glide path angle $\gamma_2$ to remain fixed with respect to earth coordinates while moving the aiming point 12 as a function of the wind speed; the apparatus of FIG. 7 fixes the terminal path angle $\gamma_1'$ with respect to the air mass, while operating to change the terminal path angle $\gamma_1$ as a function of the wind speed.

Figure 9:
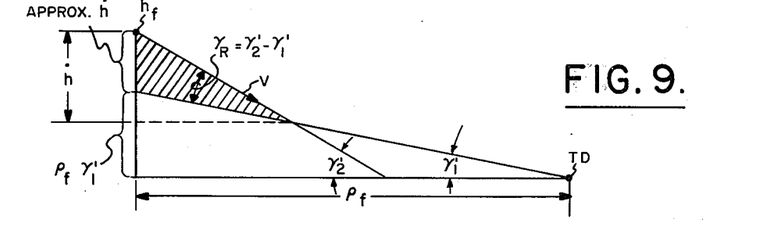
FIG. 9 is a diagram showing geometry useful in deriving a signal representing the altitude at which the flare maneuver is to be executed.

With the apparatus of FIG. 3 the reference altitude $h_f$ at which the aiming points 12 and TD were switched was assumed constant. However, for best operation the reference altitude $h_f$ is variable as illustrated by the geometry shown in FIG. 9, i.e. the flare altitude is greater for high speeds and high closure rates to the terminal path than for low speeds and low closure rates. Assuming a constant flare range $\rho_f$ (the value of which depends on the aircraft concerned) from the touchdown point TD, the flare altitude will vary as a function of the FIG. 9 shaded triangle. That is, $$h_f = \rho_f \gamma_1' + f(\dot{h})$$

where $\dot{h}$ approximately equals $v(\gamma_2' - \gamma_1')$. Therefore, $$h_f \approx \rho_f \gamma_1' + v(\gamma_2' - \gamma_1')$$

Figure 10:
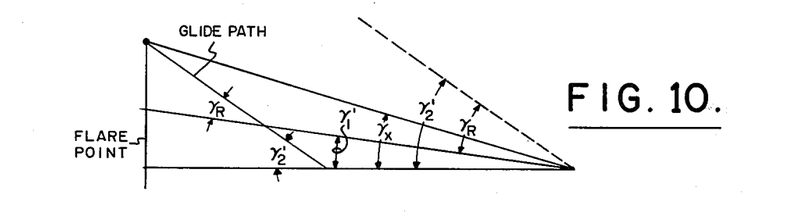
FIG. 10 is a diagram useful in proving the validity of the technique described with reference to FIG. 9.

To appreciate why $\gamma_R$ should equal $\gamma_2 - \gamma_1$ ("prime" notations are included in the above equation for $h_f$ since the computations after the flare point involves only air mass terms) reference should be had to FIG. 10 which shows by inspection such relationship.

Figure 11:
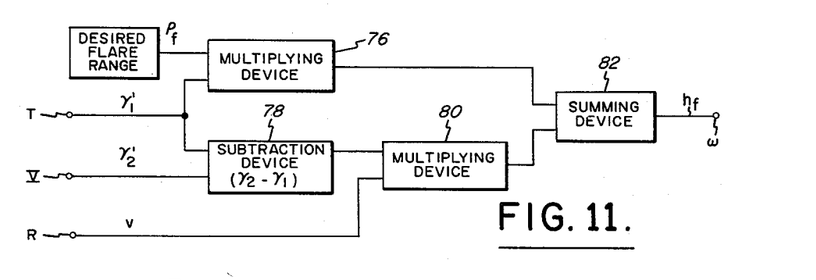
FIG. 11 is a block diagram of apparatus for implementing the geometric computation taught by FIG. 9.

Referring to FIG. 11, an implementation of the aforedescribed geometric considerations for providing the variable flare altitude reference signal $h_f$ has a multiplying device 76 adapted to receive a signal representing a desired flare range $\rho_f$ and a signal $\gamma_1'$ gotten from point T on FIG. 7. The $\gamma_1'$ signal is applied in addition to a subtraction device 78 adapted to receive the $\gamma_2'$ signal appearing at point V of FIG. 6. The subtraction device 78 output signal is applied then to a multiplying device 80 adapted to receive the air speed signal $v$ at point R of FIG. 6. A summing device 82 receives the output signals from the multiplying devices 76 and 80 and produces the reference flare altitude signal $h_f$. By connecting the circuit of FIG. 11 to the point $w$ of FIG. 3 in place of the altitude reference device 50) the apparatus of FIG. 3 has the variable flare altitude reference technique as discussed above.

Until now, no mention has been made of how the glide path itself is intercepted by the craft, i.e. how the craft gets on the glide path in the first place. Generally, this is done in somewhat the same manner as when the craft goes from the glide path to the terminal path. For example, by equating a signal representing the displacement of the craft from the glide path to a signal representing the rate of change of such displacement, a control signal is produced which causes the craft to bracket the glide path asymptotically, i.e. by flying the craft to cancel continually the control signal the craft must fly an asymtotic approach to the desired glide path.

Figure 12:
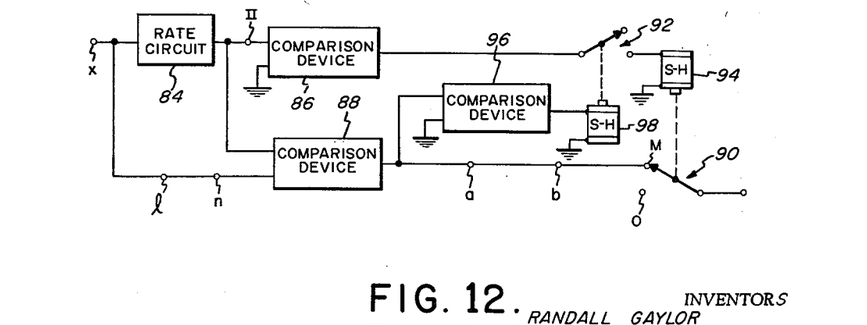
FIG. 12 is a block diagram of apparatus useful in performing a bracketing maneuver to the selected glide path.

One implementation of the aforementioned rate-displacement bracketing technique is shown in FIG. 12 as having a differentiating or rate circuit 84 adapted to receive the signal $\gamma_e$ representing the angular displacement of the craft from the desired glide path which appears at point X of FIG. 3. The rate circuit 84 output signal $\dot{\gamma}_e$ is applied to two comparison devices 86 and 88. The comparison device 88 compares the rate signal output from the circuit 84 with the displacement signal input to the rate circuit to provide a control signal which is adapted to be applied to the craft autopilot during the bracketing phase of the landing maneuver when the relay actuated switch 90 is in its upper position. (The comparison device 88 actually performs an algebraic addition of its input signals and may therefore take the form of any of the aforementioned summing devices.)

The comparison device 86, in addition to receiving the rate signal $\dot{\gamma}_e$ receives a signal representing a zero approach rate and produces an output pulse at the instant the rate of approach for the desired glide path is zero. The comparison device 86 output pulse is applied through a switch 92 to a self-holding relay 94 (self-holding contacts not shown for clarity) which actuates the switch 90. A comparison device 96, like the comparison device 86, receives the control signal appearing at the output of the device 88 and compares such control signal to a zero reference signal and produces an output pulse to actuate a self-holding relay 98 during bracketing.

When the craft acquires the desired glide path, its displacement rate is zero, thereby causing the relay 94 to actuate and drive the switch 90 to its "0" position; however, before the relay 94 may actuate, the switch 92 must be closed. Since the relay 94 energizes when the displacement rate signal is zero, false actuation of the relay 94 may occur when flying parallel to, but not along the desired glide path. For this reason, the comparison device 96 and relay 98 are provided to assure that the relay 94 will actuate only when the displacement rate signal and the control signal are simultaneously zero (i.e. when the craft is on the desired glide path).

Figure 13:
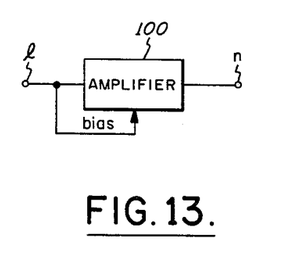
FIG. 13 is a block diagram of a circuit adapted to be connected into the block diagram of FIG. 12 to provide improved operation of the apparatus of that diagram.

The sharpness of the glide path bracketing maneuver depends on the magnitude of the ratio of the gain of the circuit 84 output rate signal to the gain of its displacement input signal, i.e. such sharpness depends on the ratio of the respective gains of the two signals applied to the comparison device 88. Since, for large craft displacements from the desired glide path during the bracketing maneuver, it is desirable to command a sharper approach path than when the craft displacement is slight, the aforementioned ratio is varied in magnitude as a direct function of the craft displacement from the desired glide path. One simple and convenient way of doing this is to vary the gain of the displacement signal in inverse relationship to the magnitude of that signal. Therefore, by including the circuit of FIG. 13 between the points $l$ and $n$ of FIG. 12 (instead of the conductor joining points $l$ and $n$) sharp commanded bracketing paths will be commanded for large craft displacements and shallow paths will be commanded for slight displacements, the result being that when the craft is on the desired glide path a low response closed control loop is provided to hold the glide path. As shown in FIG. 13, the gain-ratio changing circuit consists of a mere amplifier 100 the gain of which is varied inversely with the amplifier input by means of a bias signal.

Since the desired glide path can take assorted values, and since the beam bracketing maneuver may be started along any of a variety of approach paths, assurance must be had during bracketing against the craft crossing through and too far to one side of the desired glide path. Such a situation might dangerously cause the craft to reach the flare altitude $h_f$ prematurely, and would certainly cause the craft to take an appreciable time to settle out and finally get on the desired glide path. Therefore, in the presently preferred form of the invention provision is made for the addition (during bracketing) to the craft pitch control signal of a pitch bias signal which allows for easy acquisition of the desired glide path by causing the craft to start to nose up before a control error signal starts to appear. In providing the above-mentioned pitch bias signal, consideration is given to the fact that different craft closure rates to the desired glide path require different amounts of bias. That is, for steep approaches it is necessary to add an appreciable bias whereas for shallow approaches biasing is of lesser importance. Since the craft intersect angle of approach to the desired glide path (which is representative of the craft rate of approach to the desired glide path) is an unknown, an equivalent of the necessary closure rate bias may be derived from the following relationship:

$$\frac{\text{Craft range } \rho}{\text{Range rate } \dot{\rho}} \approx \frac{\text{Bracketing Intersect Angle of Approach}}{\text{Bracketing Intersect Angle Rate } (\dot{\gamma}_x \text{ or } \dot{\gamma}_e)}$$

from which the intersect angle representation of the closure rate bias may be found to be approximately $$\frac{\rho \gamma_e}{\rho}$$

Since $\gamma_e$ can take either of two senses, it is here pointed out that such bias will work equally well to cause the craft to nose down during an approach from beneath the beam center, thereby again working to prevent an overshoot.

Figure 14:
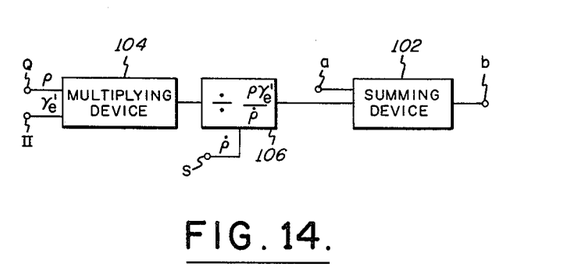
FIG. 14 is a block diagram of another circuit adapted to be connected into the block diagram of FIG. 12 to provide pitch bias during the bracketing maneuver.

Referring to FIG. 14 a circuit adapted to be connected to the FIG. 12 points $a$ and $b$ (instead of the conductor shown) to provide the aforementioned pitch bias signal has a summing device 102 adapted to receive the comparison device 88 output signal. A multiplying device 104 receiving the range signal $\rho$ (appearing at point Q of FIG. 3) and the signal $\gamma_e$ (appearing at point II of FIG. 12) applies its product output signal to a divider 106 adapted to receive a divisor signal $\rho$ appearing at point S of FIG. 6. The quotient output signal from the divider 106 is then applied to the summing device 102 and added to the craft control signal appearing at point $a$ to produce a resultant control signal imbued with a variable bias component.

At touchdown it is important that the craft have as little speed as possible to assure safe landing conditions and reduce tire wear caused by contact with the ground. In reducing the craft speed to a minimal amount consideration must be given to those craft conditions (speed, weight, and angle of attack) necessary for 1g flight, i.e. flight when lift exactly equals the force of gravity. For a given craft weight and speed, its angle of attack must be a given amount for 1g flight; should the craft speed decrease, its angle of attack must increase (otherwise the craft will lose altitude). However, in increasing the craft angle of attack assurance must be had that the actual craft angle of attack never equals the craft stall angle of attack $\alpha_{STALL}$ (a constant) for which a stall condition occurs regardless of the craft speed and weight. If the craft touchdown angle of attack is less than the stall angle of attack, the craft speed will be minimal for a given stall margin, i.e. that combination of craft speed, weight and angle of attack necessary to assure flight along the terminal path. In apparatus embodying the present invention, provision is made to retard automatically the craft throttles to idle at the flare altitude. Therefore, to hold the desired terminal path during the final phase of the landing maneuver, the craft must continually pitch up (increasing angle of attack) to maintain aerodynamic lift. Since, as noted above, the craft must have at touchdown a particular angle of attack which does not quite equal the stall angle of attack, it must also have a particular lesser angle of attack $\alpha_{FLARE}$ at the flare point.

For the craft to acquire the flare point angle of attack $\alpha_{FLARE}$, it must have its actual angle of attack $\alpha_{ACTUAL}$ gradually increased during the glide path phase of the landing maneuver (with corresponding decreases in air speed so that it will hold the glide path and not climb). In order to increase the craft angle of attack gradually, use is made by the present invention of a gradually increasing commanded angle of attack reference $\alpha_{COMMANDED}$ against which the actual craft angle of attack is compared. Error signals resulting from such comparison are integrated and used to retard gradually the craft throttles all the while the craft is controlled to fly along the glide path. As a result, the craft noses up continually until, at the flare point, $$\alpha_{ACTUAL} = \alpha_{COMMANDED} = \alpha_{FLARE}$$

To provide a signal representing a commanded angle of attack, a bias signal $\alpha_{BIAS}$ (the value of which depends on the craft) is provided and modified as a direct function of $\gamma_2'$, and as an inverse function of the craft range to touchdown. For steep selected desired glide paths $\gamma_2'$, therefore, the rate of bleeding off air speed and correspondingly increasing craft angle of attack is appreciable whereas for extensive ranges to touchdown such air speed bleed off and angle of attack increase rates are slight.

Figure 15:
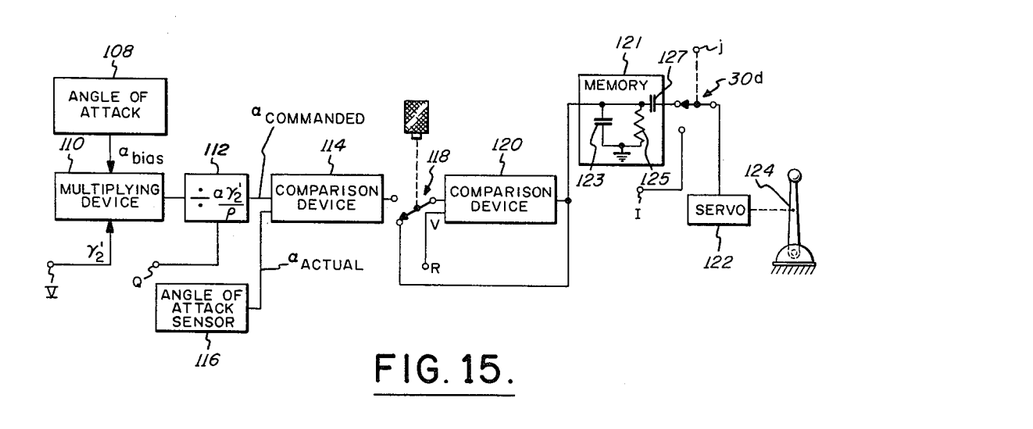
FIG. 15 is a block diagram of throttle control apparatus useful with the instant invention.

Referring to FIG. 15, an angle of attack reference 108 produces a bias signal $\alpha_{BIAS}$ and applies such signal to a multiplying device 110, the multiplying device being adapted to receive the signal $\gamma_2'$ appearing at point V of FIG. 6. The output signal from the multiplying device 110 is therefore a bias signal that varies directly with the steepness of the selected desired glide path. A divider 112, receiving the range signal $\rho$ appearing at point Q of FIG. 3 and the multiplying device 110 output signal, produces a signal representing the commanded angle of attack by modifying the multiplying device 110 output signal inversely as a function of the magnitude of the craft range. Then, a comparison device 114 receives and compares a signal representing the actual craft angle of attack $\alpha_{ACTUAL}$ (produced by a sensor 116) with the commanded angle of attack signal $\alpha_{COMMANDED}$ appearing at the output of the divider 112.

A manually operated throttle control switch 118 applies the comparison circuit 114 output error signals to a comparison device 120 when the switch is in its upper position, but when the switch 118 is in its lower position it acts as a feedback path around the comparison device 120, thereby permitting the circuit 120 to compare its input air speed signal $v$ (appearing at point R of FIG. 6) with its output signal. A memory device 121 having a capacitor 123 stores the comparison device 120 output signal so that under quiescent conditions the signal developed across a resistor 125 and applied through a capacitor 127 and switch 30d to a position servo 122 is zero. So long as the throttle control switch is not engaged, the craft throttles 124 (which connect to and are driven by the servo 122) may be moved freely by the pilot since the comparison circuit 120 output signal continually follows up on the servo shaft position to keep the servo input signal zero. However, with the throttle control switch 118 moved to its upper position, the throttles 124 move to be positioned according to the integral of the errors between the commanded and angle of attack signals. In this way, the throttles 124 get retarded as the craft angle of attack increases.

The switch 30d is adapted to remain in its upper position prior to the terminal phase of the landing maneuver, i.e. prior to the flare point when the craft is on the glide path. However, at the flare point, the switch 30d moves to its lower position in response to the FIG. 3 relay 30. Then, a large bias signal applied to the point I causes the servo 122 to retard the throttles 124 to their idle positions, after which the craft noses up continually to hold the terminal path. At touchdown the actual craft angle of attack is just less than $\alpha_{STALL}$ and the craft speed is minimal.

Figure 16:
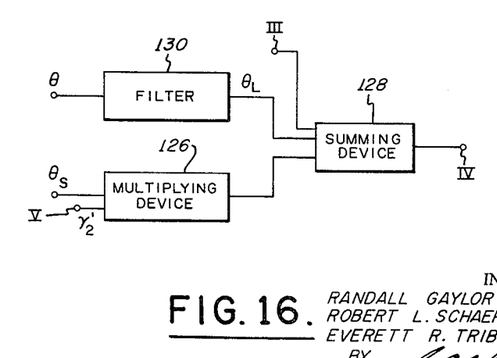
FIG. 16 is a block diagram of a circuit adapted to be connected into the circuit of FIG. 3 to provide pitch bias during the flare maneuver.

Referring to FIG. 16 a circuit, adapted to be connected to points III and IV of FIG. 3 (instead of the conductor shown) to provide the same kind of assurance during flare as was provided by the circuit of FIG. 14 during bracketing, has a pitch bias signal $\theta_S$ applied to a multiplying device 126 along with the signal $\gamma_2'$ appearing at point V of FIG. 6. The multiplying device output signal is then applied to a summing device 128 adapted to receive the pitch control signal appearing at point III. Hence, the summing device 128 has a control signal output modified to vary as a function of the steepness of the desired glide path, thereby assuring that the craft will nose up more to acquire the terminal path for steep glide paths than for shallow paths. Aside from the above-described pitch bias signal, the summing device 128 is also imbued with a long term pitch bias signal $\theta_L$ appearing at the output of a filter 130, such filter being adapted to receive a pitch bias signal $\theta$. The filter 130 has a long time constant and serves to provide some anticipation for the increase in angle of attack made necessary when the air speed bleeds off as a result of the throttles being retarded to their idle positions at the flare point.

Figure 17A:
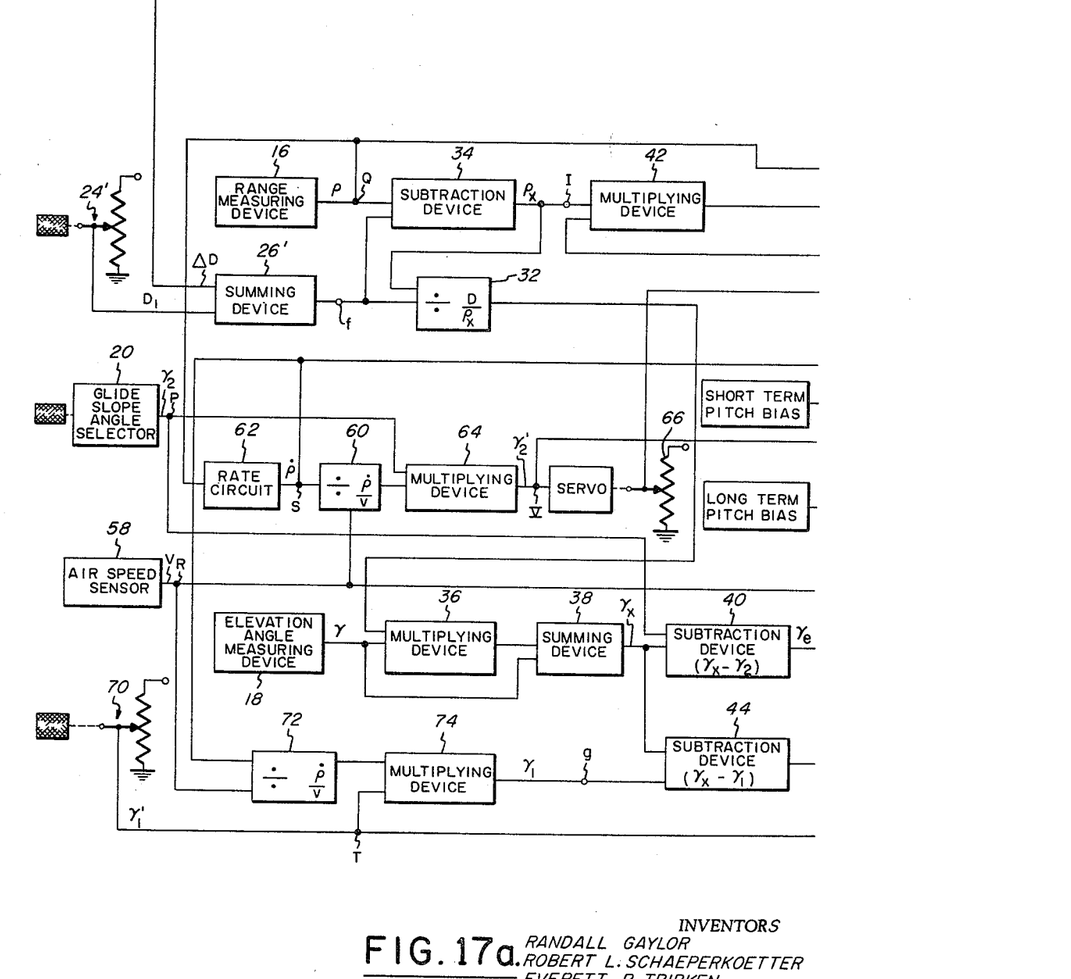
FIG. 17 is an overall block diagram incorporating the apparatus of FIGS. 3, 6, 7 and 11 through 16.
Figure 17B:
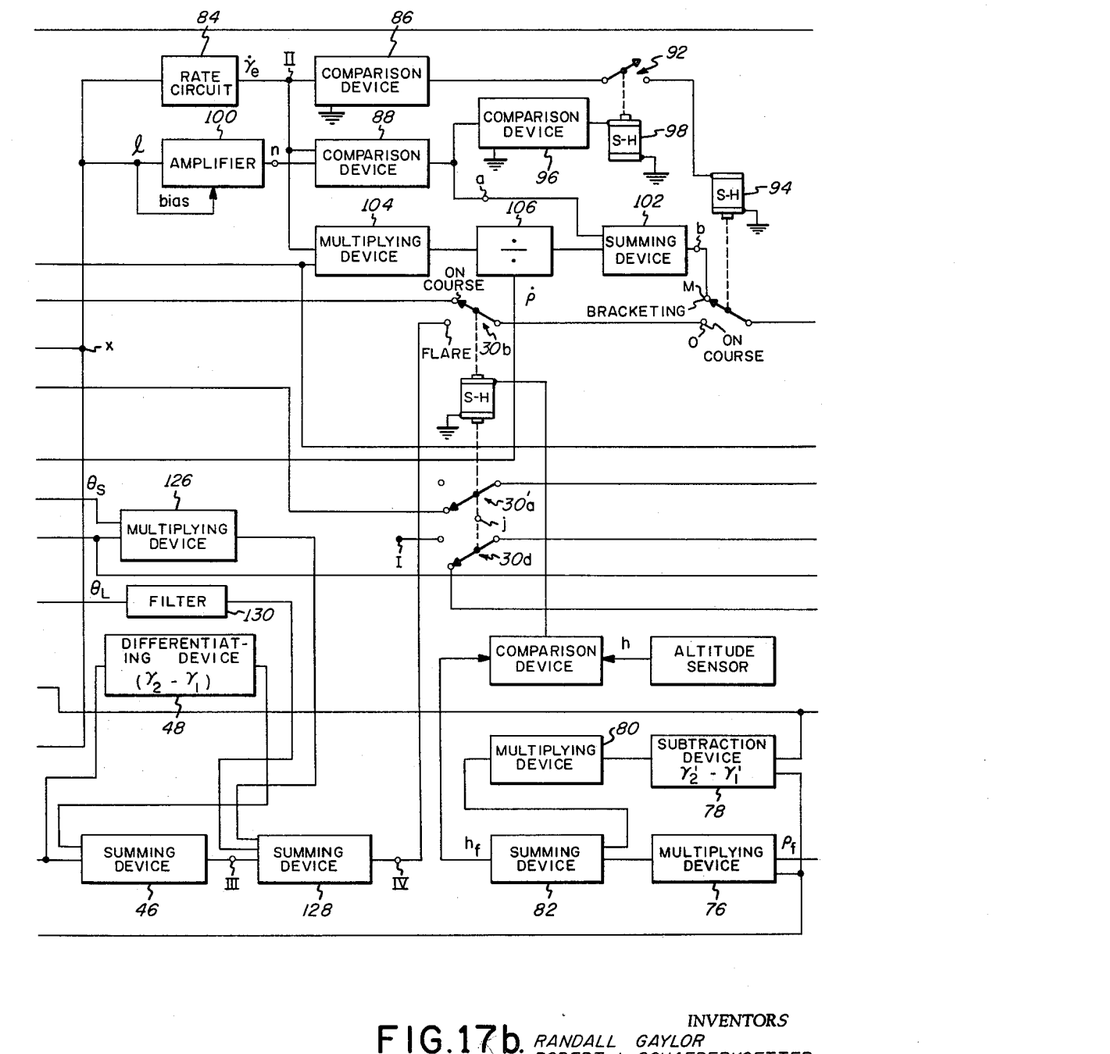
Figure 17C:
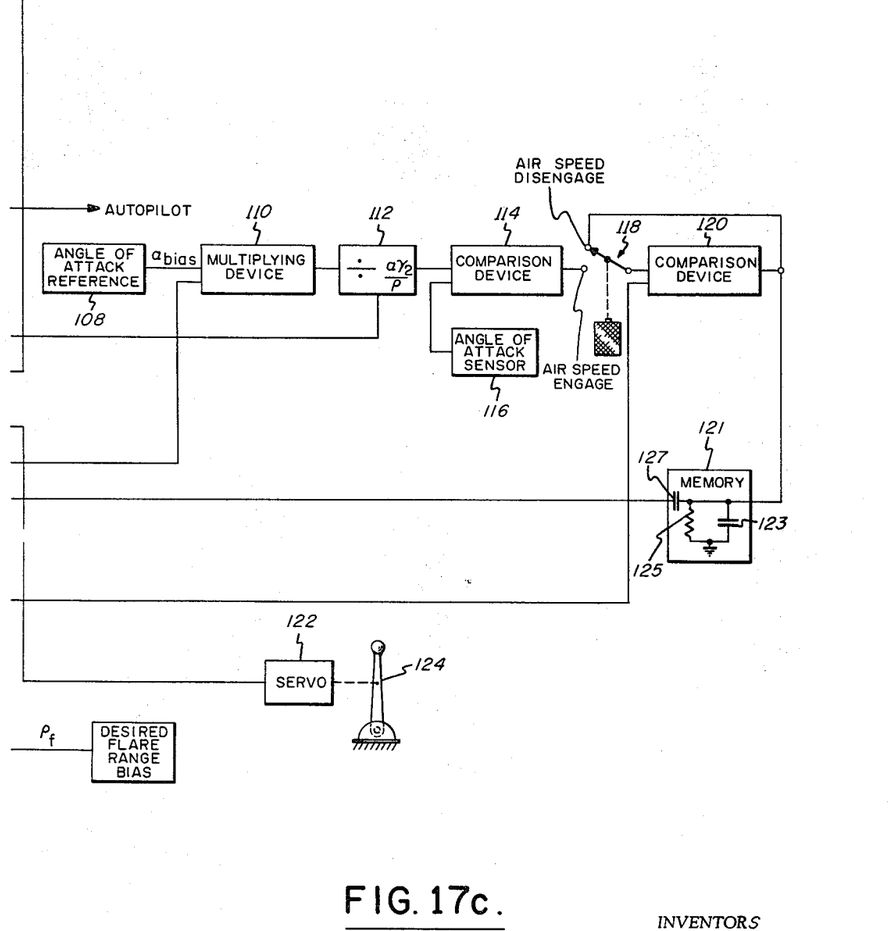

Whereas FIG. 17 shows a block diagram of a landing control apparatus embodying all of the features described with relation to FIGS. 3, 6, 7 and 11 through 16, the aforedescribed techniques obviously may be combined in various other combinations. In addition, it is obvious that the individual techniques may be changed slightly while still practicing the invention. For example, instead of computing with an angular displacement signal $(\gamma_{XF}-\gamma_1)$ during flare, a signal $(h-\rho_{XF}\gamma_1)$ may be used because $h$ is proportional to $\gamma_{XF}$ and $\rho_{XF}\gamma_1$ is approximately proportional to $\gamma_1$. See FIG 1. Likewise a rate signal $(\dot{h}-v'\gamma_1')$ may be used in the flare computation instead of $$\overline{(\gamma_{XF}-\gamma_1)}$$

because the actual or total rate of descent $\dot{h}$ less approximately $v\gamma_1'$ (see FIG. 9) is proportional to the terminal path closure rate term $\gamma_R$. Still another type change that might be provided is the use of an angular displacement signal $(\gamma_{XI}-\gamma_2)$ instead of the linear displacement signal $\rho_{XI}$ $(\gamma_{XI}-\gamma_2)$.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for use in controlling the flight of an aircraft during a landing maneuver comprising means for controlling said craft to a desired glide path and at a predetermined altitude controlling said craft to a desired less steep terminal path, and throttle control apparatus comprising means for gradually retarding the throttles of said craft above said predetermined altitude, whereby the angle of attack of said craft gradually increases to a first predetermined amount as the craft flies to hold said desired glide path and means at said predetermined altitude for retarding said throttles to their idle positions, whereby the angle of attack of said craft gradually increases to a second predetermined amount as the craft flies to hold the terminal path, said second predetermined angle of attack amount being less than the craft stall angle of attack.

2. Apparatus for use in controlling the flight of an aircraft during a landing maneuver comprising means for controlling said craft to a desired glide path and at a predetermined altitude controlling said craft to a desired less steep terminal path, and throttle control means for gradually retarding the throttles of said craft above said predetermined altitude and at said predetermined altitude retarding said throttles to their idle positions, whereby the angle of attack of said craft gradually increases to a first predetermined amount as the craft flies to hold said desired glide path and to a second predetermined amount as the craft flies to hold the terminal path, said second predetermined angle of attack amount being less than the craft stall angle of attack, said throttle control means comprising means for providing a changeable signal representative of a gradually increasing commanded angle of attack and means for producing a signal representative of the actual angle of attack of said craft, means for comparing said angle of attack signals to produce error signals representative of the difference between said signals, and servo means responsive to said error signals to retard accordingly the throttles of said craft.

3. The apparatus of claim 2 wherein said means for providing a changeable signal representative of a gradually increasing commanded craft angle of attack includes means for varying the rate that said commanded angle of attack representative signal changes as a direct function of the steepness of said glide path.

4. The apparatus of claim 2 wherein said means for providing a changeable signal representative of a gradually increasing commanded craft angle of attack includes means for varying the rate that said commanded angle of attack representative signal changes as an inverse function of the craft range to the desired touchdown point.

5. The apparatus of claim 2 wherein said means for providing a changeable signal representative of a gradually increasing commanded craft angle of attack includes means for varying the rate that said commanded angle of attack representative signal changes as a direct function of the steepness of said glide path and as an inverse function of the craft range to the desired touchdown point.

6. Throttle control apparatus for use by aircraft during a landing maneuver comprising means for providing a changeable signal representative of a gradually increasing commanded angle of attack and means for producing a signal representative of the actual angle of attack of said craft, means for comparing said angle of attack signals to produce error signals representative of the difference between said signals, and servo means responsive to said error signals to retard accordingly the throttles of said craft, said means for providing a changeable signal representative of a gradually increasing commanded craft angle of attack including means for varying the rate that said commanded angle of attack representative signal changes as a direct function of the steepness of the landing glide of said craft.

7. Throttle control apparatus for use by aircraft during a landing maneuver comprising means for providing a changeable signal representative of a gradually increasing commanded angle of attack and means for producing a signal representative of the actual angle of attack of said craft, means for comparing said angle of attack signals to produce error signals representative of the difference between said signals, and servo means responsive to said error signals to retard accordingly the throttles of said craft, said means for providing a changeable signal representative of a gradually increasing commanded craft angle of attack including means for varying the rate that said commanded angle of attack representative signal changes as an inverse function of the craft range to the desired touchdown point.

8. Throttle control apparatus for use by aircraft during a landing maneuver comprising means for providing a changeable signal representative of a gradually increasing commanded angle of attack and means for producing a signal representative of the actual angle of attack of said craft, means for comparing said angle of attack signals to produce error signals representative of the difference between said signals, and servo means responsive to said error signals to retard accordingly the throttles of said craft, said means for providing a changeable signal representative of a gradually increasing commanded craft angle of attack including means for varying the rate that said commanded angle of attack representative signal changes as a direct function of the steepness of the landing glide of said craft, and as an inverse function of the craft range to the desired touchdown point.

9. Apparatus for use in controlling the flight of an aircraft during a landing maneuver comprising means for controlling said craft to a desired glide path and at a predetermined altitude controlling said craft to a desired less steep terminal path, and throttle controls means for gradually retarding the throttles of said craft above said predetermined altitude and at said predetermined altitude retarding said throttles to their idle positions, whereby the angle of attack of said craft gradually increases to a first predetermined amount as the craft flies to hold said desired glide path and to a second predetermined amount as the craft flies to hold the terminal path, said second predetermined angle of attack amount being less than the craft stall angle of attack, said means for controlling said craft to desired paths comprising means for producing a first control signal representative of the craft displacement from said desired glide path, whereby the craft acquires the desired glide path by being flown to cancel said first control signal above said predetermined altitude, and means for producing a second control signal representative of the craft displacement from the desired terminal path, said desired terminal path intersecting the ground at a point more distant from the craft than the point at which said desired glide path intersects the ground, whereby the craft acquires the desired terminal path by being flown to cancel said second control signal below said predetermined altitude.

10. The apparatus of claim 9 wherein said means for producing a first control signal includes means for producing signals representative of the craft range to and elevation angle from a first ground point more distant from the craft than the point at which said desired glide path intersects the ground, means for producing a first distance signal representative of the distance between said first ground point and the point at which said glide path intersects the ground, means for producing a difference distance signal representative of the difference between said range and said first distance signals, means for producing a glide angle representative signal proportional to the sum of said elevation angle signal and the quotient of said difference distance signal divided into a signal representative of the product of said distance representative signal and said elevation angle signal, means for producing a signal representative of the angle that said glide path makes with the ground, and means for comparing said glide angle signal with said glide path angle signal to produce a signal representative of the angular displacement of the craft from said desired glide path.

11. The apparatus of claim 9 wherein said means for producing a second control signal includes means for producing signals representative of the craft range and elevation angle from a first ground point more distant from the craft than the point at which the desired terminal path intersects the ground, means for producing a resultant distance signal representative of the distance between said first ground point and the point at which said desired terminal path intersects the ground, means for producing a resultant difference distance signal representative of the difference between said range and said resultant distance signals, means for producing a resultant glide angle representative signal proportional to the sum of said elevation angle representative signal and the quotient of said resultant difference distance signal divided into a signal representative of the product of said resultant distance representative signal and said elevation angle signal, means for producing a signal representative of the angle that said desired terminal path makes with the ground, and means for comparing said resultant glide angle signal with said desired terminal path angle signal to produce a signal representative of the angular displacement of the craft from the desired terminal path.

12. The apparatus of claim 9 wherein said means for producing a first control signal includes means for producing signals representative of the craft range to and elevation angle from a first ground point more distant from the craft than the point at which both said desired glide path and said desired terminal path intersect the ground, means for producing a first distance signal representative of the distance between said first ground point and the point at which said glide path intersects the ground, means for producing a difference distance signal representative of the difference between said range and said first distance signals, means for producing a glide angle representative signal proportional to the sum of said elevation angle signal and the quotient of said difference distance signal divided into a signal representative of the product of said distance representative signal and said elevation angle signal, means for producing a signal representative of the angle that said glide path makes with the ground, and means for comparing said glide angle signal with said glide path angle signal to produce a signal representative of the angular displacement of the craft from said desired glide path, said means for producing a second control signal including means for producing a resultant distance signal representative of the distance between said first ground point and the point at which said terminal path intersects the ground, means for producing a resultant difference distance signal representative of the difference between said range and said resultant distance signals, means for producing a resultant glide angle representative signal proportional to the sum of said elevation angle representative signal and the quotient of said resultant difference distance signal divided into a signal representative of the product of said resultant distance representative signal and said elevation angle signal, means for producing a signal representative of the angle that said terminal path makes with the ground, and means for comparing said resultant glide angle signal with said terminal path angle signal to produce a signal representative of the angular displacement of the craft from the terminal path.

13. Apparatus for use in producing a control signal whereby an aircraft may be flown to and along a reference path comprising means for producing signals representative of the craft range to and elevation angle from a first ground point more distant from the craft than the point at which said reference path intersects the ground, means for producing a first distance signal representative of the distance between said first ground point and the point at which said reference path intersects the ground, means for producing a difference distance signal representative of the difference between said range and said first distance signals, means for producing a glide angle representative signal proportional to the sum of said elevation angle signal and the quotient of said difference distance signal divided into a signal representative of the product of said distance representative signal and said elevation angle signal, means for producing a signal representative of the angle that said reference path makes with the ground, and means comparing said glide angle signal with said reference path angle signal to produce a signal representative of the angular displacement of the craft from said reference path.

14. The apparatus of claim 13 including means for decreasing said difference distance signal directly as a function of the head wind speed.

15. The apparatus of claim 13 including means for increasing said difference distance signal directly as a function of the angle that said reference path makes with the ground.

16. Apparatus for use in producing a first control signal whereby an aircraft may be controlled to and along a reference glide path above a predetermined altitude, and for producing a second control signal whereby said aircraft may be controlled to and along a less steep terminal path that intersects the ground at a point more distant from the craft than the point at which the glide path intersects the ground comprising means for producing signals representative of the craft range to and elevation angle from a first ground point more distant than both the points at which the glide and terminal paths respectively intersect the ground, means for producing a first distance signal representative of the distance between said first ground point and the point at which said glide path intersects the ground, means for producing a difference distance signal proportional to the difference between said range and said first distance signals, means for producing a glide angle representative signal proportional to the sum of said elevation angle signal and the quotient of said difference distance signal divided into a signal representative of the product of said distance representative signal and said elevation angle signal, means for producing a signal representative of the angle that said glide path makes with the ground, and means for comparing said glide angle signal with said glide path angle signal to produce a signal representative of the angular displacement of the craft from said glide path, means for producing a resultant distance signal representative of the distance between said first ground point and the point at which said terminal path intersects the ground, means for producing a resultant difference distance signal representative of the difference between said range and said resultant distance signals, means for producing a resultant glide angle representative signal proportional to the sum of said elevation angle representative signal and the quotient of said resultant difference distance signal divided into a signal representative of the product of said resultant distance representative signal and said elevation angle signal, means for producing a signal representative of the angle that said terminal path makes with the ground, and means for comparing said resultant glide angle signal with said terminal path angle signal to produce a signal representative of the angular displacement of the craft from the terminal path.

17. The apparatus of claim 16 wherein said desired glide path is with respect to earth coordinates and said terminal path is with respect to air mass coordinates.

18. The apparatus of claim 16 including means for stabilizing with respect to earth coordinates the angle that said glide path makes with the ground and stabilizing with respect to air mass coordinates the angle that said terminal path makes with the ground.

19. The apparatus of claim 16 including means for determining the altitude at which craft control by said first control signal is changed to control by said second control signal, said means determining said altitude as a direct function of the head wind speed and the rate of closure of the craft to the terminal path.

20. Landing control apparatus comprising means for producing a signal for controlling a craft to a desired glide path, means for producing a signal for controlling the craft to a desired terminal path, and means for determining the altitude at which craft controlled by said first control signal is changed to control by said second control signal as direct functions of the head wind speed and the rate of closure of the craft to the terminal path.

21. Apparatus for use in landing an aircraft comprising
  (a) means for controlling said craft to a desired glide path above a predetermined altitude and, below said predetermined altitude, controlling the craft to a desired less steep terminal path and
  (b) throttle control means gradually retarding the throttles of said craft above said predetermined altitude and at said predetermined altitude retarding said throttles to their idle positions, whereby the angle of attack of said craft gradually increases to one predetermined amount as the craft flies to hold said desired glide path and to another predetermined amount as said craft flies to hold said terminal path, said throttle control means comprising
    (1) means for providing a changeable signal representative of a gradually increasing commanded angle of attack,
    (2) means for producing a signal representative of an actual angle of attack of said craft,
    (3) means for comparing said angle of attack signals to produce error signals representative of the difference between said signals.
    (4) servo means responsive to said error signals to retard accordingly the throttles of said craft,
    (5) and means for varying the rate that said commanded angle of attack representative signal changes as a direct function of the steepness of glide path and as an inverse function of the craft range to the desired touchdown point,
  said means for controlling said craft comprising
    (1) means for producing a first control signal representative of the craft displacement from said glide path, whereby the craft acquires the glide path by being flown to cancel said first control signal above said predetermined altitude, and
    (2) means for producing a second control signal representative of the craft displacement from a less steep terminal path that intersects the ground at a point more distant from the craft than the point at which said glide path intersects the ground, whereby the craft acquires the terminal path by being flown to cancel said second control signal below said predetermined altitude, said means for producing a first control signal comprising
      (a) means for producing signals representative of the craft range to and elevation angle from a first ground point more distant from the craft than the points at which said desired glide and terminal paths intersect the ground,
      (b) means for producing a first distance signal representative of the distance between said first ground point and the point at which said glide path intersects the ground,
      (c) means for producing a difference distance signal representative of the difference between said range and said first distance signals,
      (d) means for producing a glide angle representative signal proportional to the sum of said elevation angle signal and the quotient of said difference distance signal divided into a signal representative of the product of said distance representative signal and said elevation angle signal,
      (e) means for producing a signal representative of the angle that said glide path makes with the ground, and
      (f) means for comparing said glide angle signal with said glide path angle signal to produce a signal representative of the angular displacement of the craft from said glide path,
  and said means for producing a second control signal comprising
    (a) means for producing a resultant distance signal representative of the distance between said first ground point and the point at which said terminal path intersects the ground,
    (b) means for producing a resultant difference distance signal representative of the difference between said range and said resultant distance signals,
    (c) means for producing a resultant glide angle representative signal proportional to the sum of said elevation angle representative signal and the quotient of said resultant difference distance signal divided into a signal representative of the product of said resultant distance representative signal and said elevation angle signal,
    (d) means for producing a signal representative of the angle that said terminal path makes with the ground, and
    (e) means for comparing said resultant glide angle signal with said terminal path angle signal to produce a signal representative of the angular displacement of the craft from the terminal path,
  and said apparatus including
    (a) means for decreasing said difference distance signal directly as a function of the head wind speed and as an inverse function of the angle that the glide path makes with the ground,
    (b) means for stabilizing with respect to earth coordinates the angle that said glide path makes with the ground and stabilizing with respect to air mass coordinates the angle that said terminal path makes with the ground,
    (c) means for determining the altitude at which craft control by said first control signal is changed to control by said second control signal as a direct function of the head wind speed and the closure rate of the craft to the terminal path, and (d) glide path bracketing means for controlling the craft to cancel simultaneously the craft displacement from and rate of approach to the glide path, said bracketing means varying the relative rates at which the craft displacement and approach rate are respectively cancelled as a function of the craft displacement from the glide path.

22. Apparatus for use in producing a glide angle signal for use in flying an aircraft to and along a reference path comprising means for producing signals representative of the craft range to and elevation angle from a first ground point more distant from the craft than the point at which said reference path intersects the ground, means for producing a first distance signal representative of the distance between said first ground point and the point at which said reference path intersects the ground, means for producing a difference distance signal representative of the difference between said range and said first distance signals, and means for producing a glide angle representative signal proportional to the sum of said elevation angle signal and the quotient of said difference distance signal divided into a signal representative of the product of said distance representative signal and said elevation angle signal.

23. The apparatus of claim 22 including means for decreasing said difference distance signal directly as a function of the headwind speed.

24. The apparatus of claim 22 including means for increasing said difference distance signal directly as a function of the angle that said reference path makes with the ground.

25. Landing control apparatus comprising first means for use in defining an aircraft landing glide path having a fixed angular relationship with respect to the earth, second means for use in defining a terminal path for said craft that intersects the ground at a fixed point more distant from said craft than the point where said desired glide path intersects the ground, third means adapted to cooperate with said first means to make the defined glide path intersect the ground closer to said fixed point as a direct function of wind speed, and fourth means adapted to cooperate with said second means to make the angular relationship of the terminal path with respect to the ground greater as a direct function of wind speed.

References Cited in the file of this patent
UNITED STATES PATENTS

| | | |
|---|---|---|
| 2,663,520 | Moseley | Dec. 22, 1953 |
| 2,830,291 | Hecht | Apr. 8, 1958 |
| 2,932,023 | Haskins | Apr. 4, 1960 |
| 3,043,540 | Greene | July 10, 1962 |
| 3,059,880 | Buxton | Oct. 23, 1962 |
| 3,096,955 | Priestley | July 9, 1963 |